US005218019A

United States Patent [19]

Kushi et al.

[11] Patent Number: 5,218,019

[45] Date of Patent: Jun. 8, 1993

[54] SUBLIMATION DISPERSON DYE RECEPTIVE RESIN COMPOSITIONS

[75] Inventors: Kenji Kushi; Tadayuki Fujiwara, both of Hiroshima, Japan

[73] Assignee: Mitsubishi Rayon Co., Ltd., Tokyo, Japan

[21] Appl. No.: 895,443

[22] Filed: Jun. 8, 1992

Related U.S. Application Data

[63] Continuation of Ser. No. 597,877, Oct. 12, 1990, abandoned.

[30] Foreign Application Priority Data

Oct. 16, 1989 [JP] Japan .................................. 1-268396

[51] Int. Cl.$^5$ .............................................. C08G 63/60

[52] U.S. Cl. ...................................... 523/500; 522/35; 523/513; 523/518; 525/446; 526/242; 526/279; 528/271; 528/272; 528/274

[58] Field of Search ........................ 525/438, 445, 446; 526/242, 245, 279; 528/271, 272, 274; 524/86; 523/507, 508, 511; 522/35

[56] References Cited

U.S. PATENT DOCUMENTS 4,877,922 10/1989 Sasaki et al. .......................... 524/91

*Primary Examiner*—Paul R. Michl

*Assistant Examiner*—Peter Szekely

*Attorney, Agent, or Firm*—Oblon, Spivak, McClelland, Maier & Neustadt

[57] ABSTRACT

A sublimation dispersion dye receptive resin composition which comprises a polyester resin, a cross- linking agent obtained by curing by activating energy, and a releasing agent which can effect the cross-linked construction of at least one selected from the group of silicon functional groups and functional groups containing fluorine. This resin composition is especially applicable to image-receiving paper or image-receiving film for sublimation-type thermal dye transfer methods; it has superior anti-blocking and heat-resistant characteristics. Furthermore, by means of the addition of benzotriazol ultraviolet stabilizer or hindered amine photostabilizer, the fading characteristics are improved.

10 Claims, No Drawings

SUBLIMATION DISPERSON DYE RECEPTIVE RESIN COMPOSITIONS

This application is a Continuation of application Ser. No. 07/597,877, filed on Oct. 12, 1990, now abandoned.

BACKGROUND OF THE INVENTION

1. Field of the Invention

The present invention pertains to dye permeable, dye receptive resin compositions, including but not limited to resin compositions suitable for use as dye receptive substrates in film, paper, textiles, plastic articles and the like, the respective articles thereby rendered capable of capturing colors, patterns, and images which can be transferred thereto by sublimation type thermal dye transfer copying, printing and coloring methods.

2. Prior Art

As dye receptive compositions applicable to sublimation type thermal dye transfer copying methods, conventionally, sheet form materials have been employed made of polyester short fibers having acidic groups which have been converted to ammonium salts by, for example, the method recited in Japanese Patent Application First Publication Serial No. Sho-60-112494, the sheet form material made of polyester short fibers with acidic groups first prepared by processing acrylic short fibers with an alkylene carbonate and ammonium salt as described in Japanese Patent Application First Publication Serial No. Sho-60-81359. Due to the fact that such materials are dyeable only by using cationic dyes, and the fact that cationic dyes tend to be photolabile, colors and images captured in conventional dye receptive compositions are prone to degradation on prolonged exposure to light.

Dye receptive compositions have been disclosed which are capable of being dyed using sublimation dispersion dyes having improved photostability characteristics compared with those of conventional cationic dyes. Examples of this kind of resin composition include that disclosed in Japanese Patent Application Second Publication Serial No. Sho-60-188644, wherein a dye receptive composition formed using acrylic polymer, cross-linking agent, phosphate ester, and an amine compound is described.

In ordinary use, these resin compositions are painted on or otherwise applied to a supporting substrate, followed by curing. The dye receiving substrate having been thus prepared is then overlaid with a sheet of transfer paper which has been processed by the application of a layer of a composition impregnated with sublimation dispersion dye (color sheet), such that the side of the transfer paper treated with the dye containing composition is adjacent to the dye receiving substrate. Upon heating, the sublimation dispersion dye sublimes and diffuses into the dye receiving substrate. These resin compositions, however, are poorly susceptible to the dyes under low energy conditions. When heating to a temperature necessary to effect suitable transfer of dye, there is a tendency for the transfer paper to stick to the dye receiving substrate, a phenomenon referred to as blocking.

By increasing the content of phosphate ester and amine compound in the resin which function as release agents, this effect can be limited. However, when the phosphate ester and/or amine compound content has been agumented to overcome the above problem, there is a tendency for the dye from the transfer paper to bleed or run when heated to a temperature of on the order of 50° to 60° C. necessary to sublime the dye, thus causing a deterioration in definition when images or patterns are being transferred.

SUMMARY OF THE INVENTION

In consideration of the above described shortcomings of conventional dye receiving resin compositions, an object of the present invention is to provide sublimation dispersion dye receptive resin compositions which are exceedingly photostable, have high affinity for dyes, and which have excellent anti-blocking properties.

A further object of the present invention is to provide sublimation dispersion dye receptive resin compositions which are exceedingly resistant to darkening under storage conditions.

In order to accomplish the above described objects, the present invention provides sublimation dispersion dye receptive resin compositions consisting of 0.01 to 30 parts by weight of at least one release agent selected from the group including silicon type release agents and fluorine containing release agents which are capable of assuming a cross-linked structure, mixed with 100 parts by weight of a mixture containing 40 to 95 parts by weight of polyester resin and 5 to 60 parts by weight of a cross-linking agent which can be hardened by exposure to activating energy.

DETAILED DESCRIPTION OF THE PREFERRED EMBODIMENTS

The constituent polyester resins of the resin compositions of the present invention provide high affinity for sublimation dispersion dyes and function as binders as well, for which reason they are one of the essential components of the resin composition of the present invention. Examples of polyesters resins include linear thermoplastic polyester resins obtained as the condensation product of dicarboxylic acids and diols, and unsaturated polyester resins obtained as the condensation product of polybasic acids having reactive double bonds and polyols. However, for the resin compositions of the present invention, the polyester resin employed should preferably be a linear thermoplastic polyester resin for which the molecular weight is between 2000 to 40,000, obtained as the condensation product of at least one type of dicarboxylic acid and at least one type of diol, having a degree of crystallization rate of 1% or less. Additionally, it is desirable the polyester resin employed be soluble in organic solvents, be readily dyeable, and have good photostability properties.

When preparing the resin compositions of the present invention, the polyester resin should preferably constitute 40 to 95 parts by weight, and more preferably 55 to 94 parts by weight of the total amount of polyester resin and cross-linking agent employed. If the amount of polyester resin employed is less than 40 parts by weight of the total amount of polyester resin and cross-linking agent, the resin compositions prepared therefrom exhibit a tendency to insufficiently absorb dye under low energy conditions, and are thus insufficiently dyeable. Conversely, if the amount of polyester resin employed is greater than 95 parts by weight of the total amount of polyester resin and cross-linking agent, the relative amount of cross-linking agent becomes insufficient, and the anti-blocking properties toward the transfer paper (color sheet) to which sublimation dispersion dye has been applied become poor. Thus, after the sublimation dispersion dye receptive resin composition has been applied to a substrate and hardened by exposure to activating radiant energy, when a color sheet is overlaid and heat is applied in order to effect transfer of dye, sticking (blocking) of the color sheet to the resin composition coated substrate is likely to occur.

Suitable examples of linear thermoplastic polyester resins obtained as the condensation product of at least one type of dicarboxylic acid and at least one type of diol which can be employed in the sublimation dispersion dye receptive resin compositions of the present invention include the condensation product of terephthalic acid and isophthalic acid with ethylene glycol and neopentyl glycol, the condensation product of terephthalic acid and isophthalic acid with ethylene glycol and the addition product of bisphenol glycol A and ethyleneoxide, the condensation product of terephthalic acid and isophthalic acid with ethylene glycol and 1, 6-hexanediol, the condensation product of terephthalic acid and isophthalic acid and sebacic acid with ethylene glycol and neopentyl glycol, the condensation product of terephthalic acid and sebacic acid with ethylene glycol and neopentyl glycol, and the condensation product of terephthalic acid and isophthalic acid and adipic acid with ethylene glycol and neopentyl glycol.

Additionally, two or more of the above condensation products can be employed together in the preparation of the sublimation dispersion dye receptive resin compositions of the present invention. In particular, from the point of view of stability on exposure to light, heat, water and the like, such a combination is preferable as a means to improve resistance to light, heat, water and other environmental factors. When two different polymers are employed, ideally neither is used in excess of 80% by weight. In place of the dicarboxylic acids such as terephthalic acid and isophthalic acid, the methyl diesters thereof can be used as starting material for the condensation reaction.

Suitable examples of unsaturated polyester resins obtained as the condensation product of polybasic acids having reactive double bonds and polyols which can be employed in the sublimation dispersion dye receptive resin compositions of the present invention include the condensation product of maleic anhydride and phthalic anhydride with propylene glycol, the condensation product of maleic anhydride and isophthalic acid with propylene glycol, the condensation product of maleic acid and fumaric acid and isophthalic acid with 1,3 butanediol, the condensation product of maleic acid and isophthalic acid with neopentyl glycol, the condensation product of maleic anhydride and tetrahydrophthalic anhydride with dipropylene glycol.

The cross-linking agent employed in the sublimation dispersion dye receptive resin compositions of the present invention promotes hardening on exposure to activating energy. Moreover, the cross-linking agent is a necessary component in that it imparts anti-blocking properties to the resin compositions. The cross-linking agent should preferably constitute 5 to 60 parts by weight, and more preferably 6 to 45 parts by weight of the total amount of polyester resin and cross-linking agent employed. If the amount of cross-linking agent employed is less than 5 parts by weight of the total amount of polyester resin and cross-linking agent, the anti-blocking properties of the resin composition become insufficient. Conversely, if the amount of cross-linking agent employed is greater than 60 parts by weight of the total amount of polyester resin and cross-linking agent, the resin compositions prepared therefrom exhibit a tendency to insufficiently absorb dye, and thus cannot be easily dyed to the desired density.

In consideration of the hardening and anti-blocking properties provided by the cross-linking agent, it is desirable that the cross-linking agent include at least one type of poly-functional monomer. In the case where ultra-violet light is being used for the activating energy to initiate polymerization, a cross-linking agent having monomers with acryloyloxy and/or methacryloyloxy moietes as the polymerizable functionalities is desirable.

Examples of monomers and oligomers having acryloyloxy or methacryloyloxy groups include polyether acrylate and polyether methacrylate compounds (hereafter acrylate and methacrylate will be collectively indicated by (meth)acrylate), polyester (meth)acrylate compounds, polyol (meth)acrylate compounds, epoxy (meth)acrylate compounds, amidourethane (meth)acrylate compounds, urethane (meth)acrylate compounds, spiroacetal (meth)acrylate compounds and polybutadiene (meth)acrylate compounds.

Concrete examples of the above monomers and include polyether (meth)acrylate compounds synthesized from 1,2,6-hexanetriol, propylene oxide and acrylic acid, or from trimethylol propane, propylene oxide and acrylic acid; polyester (meth)acrylate compounds such as those synthesized from adipic acid, 1,6-hexanediol and acrylic acid, or from succinic acid, trimethylol propane and acrylic acid; (meth)acrylate or polyol (meth)acrylate compounds such as triethylene glycol diacrylate, hexapropylene glycol diacrylate, neopentylglycol diacrylate, 1,4-butanediol dimethacrylate, 2-diethyl hexylacrylate, tetrahydrofurfuryl acrylate, 2-hydroxyethyl methacrylate, ethylcarbitol acrylate, trimethylol propane triacrylate, pentaerythritol tetraacrylate, dipentaerythritol tetraacrylate, 2,2-bis(4-acryloyloxidiethoxyphenyl) propane and 2,2-bis(4-acryloyloxipropoxyphenyl) propane; epoxy(meth)acrylate compounds such as those synthesized from the diglycidyl ether of bisphenol A and acrylic acid, from the diglycidyl ether of polybisphenol A and acrylic acid or from the triglycidyl ether of glycerin and acrylic acid; amidourethane (meth)acrylate compounds such as those synthesized from γ-butyrolactone, N-methylethanolamine, bis(4-isocyanatocyclohexyl) methane and 2-hydroxy ethylacrylate, or from γ-butyrolactone, N-methylethanolamine, 2,6-tolylene diisocyanate, tetraethylene glycol and 2-hydroxyethyl acrylate; urethane acrylate compounds such as 2,6-tolylene diisocyanate diacrylate, isophorone diisocyanate diacrylate and hexamethylene diisocyanate diacrylate; spiroacetal acrylate compounds formed from diallylidene pentaerythritol and 2-hydroxy ethylacrylate; and acrylated polybutadiene compounds formed from epoxidized butadiene and 2-hydroxy ethylacrylate. The above monomers and oligomers may be used independently, or in combination as mixtures of two or more.

The cross-linking agents employed in the sublimation dispersion dye receptive resin compositions of the present invention should ideally dry rapidly in room air. Among the cross-linking agents listed in the preceding paragraphs, in terms of the above described drying properties, particularly good examples of cross-linking agents which are applicable when ultra-violet light is to be used as the activating energy to initiate polymerization include compounds encompassed by general chemical structure diagram (I) below:

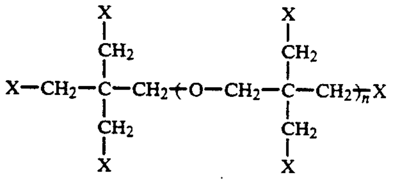

(I)

wherein n is an integral value between one and four, and each X designates a chemical group, at least three of which are $CH_2{=}CH{-}COO{-}R_8{-}$ groups where $R_8$ is absent or consists of an alkylene radical formed from one to eight carbon atoms, or a polyoxy alkylene radical formed from one to eight carbon atoms. The remaining groups designated by X consist of alkane radicals formed from one to eight carbon atoms, hydroxy radicals, amino radicals, $-(OR_9)_m-H$ groups, where $R_9$ consists of an alkylene radical formed from one to eight carbon atoms and m is an even integer or $-(OR_9)_m-OH$ groups, where $R_9$ consists of an alkylene radical formed from one to eight carbon atoms and m is an even integer.

Concrete examples of the compounds defined in the previous paragraph include dipentaerythritol tetraacrylate, dipentaerythritol pentaacrylate, dipentaerythritol hexaacrylate, tripentaerythritol pentaacrylate, tripentaerythritol hexaacrylate and tripentaerythritol heptaacrylate.

Other cross-linking agents applicable to the sublimation dispersion dye receptive resin compositions of the present invention having especially desirable properties when employed therein include polybisphenyl A polyacrylates encompassed by general chemical structure diagram (II) below:

one of the previously specified polyester resins in an amount of 40 to 95 parts by weight is not sufficient in and of itself. As another indispensable component, for the sublimation dispersion dye receptive resin compositions of the present invention, at least one release agent should be included, selected from the group including silicon type release agents and fluorine containing release agents which are capable of assuming a cross-linked structure. In particular, when the resin compositions of the present invention are employed in sublimation type thermal dye transfer copying methods as the image receiving substrate applied to paper, film and the like, when the resistance elements in the thermal heads are instantaneously heated to several hundreds of degrees which occurs in normal operation, the anti-blocking properties of the resin composition to the color sheet may degrade completely, thus resulting in sticking and incomplete separation of the color sheet and image receiving material.

In order to solve this problem, conventionally phosphate ester compounds and amine compounds are used together as a release agent, or alternately, a silicon type detergent, silicon oil, or fluorine type detergent are used. However, each of these conventional agents totally lack the ability to form a cross linked structure, for which reason their use will frequently lead to bleeding of the dyes which is distinctly undesirable. This undesirable characteristic is particularly problematic when these conventional release agents are used in increased quantities to eliminate blocking, and under such circumstances, smudging, smearing and bleeding of colors in the copying process are likely to occur.

In consideration of the foregoing, with the sublimation dispersion dye receptive resin compositions of the present invention, rather than the above conventional

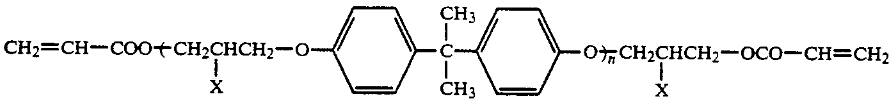

(II)

wherein n is an even integral value between two and ten, and each X either a hydroxy group or a $-OCOCH{=}CH_2$ group. Concrete examples of these compounds include diacrylates such as the diacrylate of the diglycidyl ether of bisphenol A and Epikote #1001 (n=3, Shell), or compounds encompassed by general chemical structure diagram (III) below:

release agents, at least one release agent is employed selected from the group including silicon type release agents and fluorine containing release agents which are capable of assuming a cross-linked structure, whereby the above described problems are circumvented. As an additional benefit, application of such release agents in the resin compositions of the present invention provides

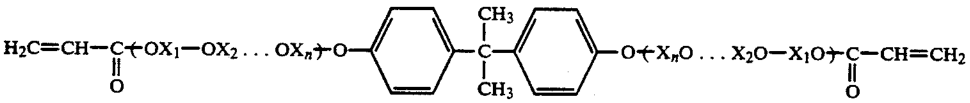

(III)

In general structure diagram (III) above, n is an integral value from zero to five, and $X_1$ through $X_n$ are identical groups of six carbon atoms or less, or differing alkylene radicals, or differing alkylene radicals for which a single hydrogen atom in each has been replaced with a hydroxy radical. Examples of compounds defined by general chemical structure diagram (III) above include 2,2-bis(4-acryloyloxydiethoxyphenyl) propane, 2,2-bis(4-acryloyloxytriethoxyphenyl) propane and 2,2-bis(4-acryloyloxydipropoxyphenyl) propane.

In terms of the objects of the present invention, using one of the above specified cross-linking agents, which can be hardened by exposure to activating energy, in an amount of 5 to 60 parts by weight, together with using a more lustrous surface for prints and copies which have been made using these resin compositions, which is frequently a desirable feature.

For the one or more silicon type release agents and/or fluorine containing release agents which are capable of assuming a cross-linked structure, those with thermally activated cross-linking properties as well as those with cross-linking properties activated by radiant energy may suitably be employed.

Examples of suitable silicon type release agents with thermally activated cross-linking properties include silicon compounds which cause addition reactions, silicon compounds which cause free radical reactions and silicon compounds which cause condensation reactions. Examples of silicon compounds and mixtures thereof which cause addition reactions include Combinations of one or more silicon compounds having vinyl radicals and one or more silicon compounds having —SiH radicals, and combinations of one or more amino modified silicon compounds and one or more epoxy modified silicon compounds. These compounds can be supplemented with platinum catalysts and the like as necessary.

Examples of silicon compounds and mixtures thereof which cause free radical reactions include combinations of one or more silicon compounds having vinyl radicals and one or more silicon compounds having methyl silane radicals. For compounds which cause free radical reactions, organic peroxides can be employed as polymerization initiating agents.

Examples of silicon compounds and mixtures thereof which cause condensation reactions include silicon compounds having alkoxy radicals, silicon compounds having silanol radicals, combinations of one or more silicon compounds having alkoxy radicals and one or more silicon compounds having silanol radicals, combinations of one or more silicon compounds having silanol radicals and one or more silicon compound —SiH radicals, and combinations of one or more silicon compounds having silanol radicals and one or more silicon compounds having aminooxy radicals.

Examples of fluorine containing compounds and mixtures thereof which cause addition reactions include combinations of one or more fluorine containing compounds having epoxy radicals and one or more fluorine containing compounds having amino radicals. Examples of fluorine containing compounds and mixtures thereof which cause condensation reactions include combinations of one or more fluorine containing compounds having carboxilic acid radicals and one or more fluorine containing compounds having amino radicals.

With use of the above silicon type release agents and fluorine containing release agents, in order to provide for the formation of an adequate cross-linked structure, each molecule of release agent should have at least two bridging functionalities. If less than two bridging functionalities are present per molecule of release agent, even if a large molecular weight polymer is formed, cross-linking within the polymer molecules will be inadequate.

Examples of compounds which form a cross-linked structure on exposure to activating energy include silicon compounds and fluorine containing compounds having vinyl radicals, allyl radicals, methacryloyl radicals, acryloyl radicals and other such radicals which promote polymerization through the formation of free radicals. When ultraviolet light is used as the source of activating energy, it is desirable to use compounds which polymerize readily under the influence of ultraviolet light, such as compounds including acryloyloxy radicals. For these types of compounds, in order to insure adequate cross-linking, it is necessary that each molecule have at least one cross-linking functionality.

Due to the fact that the polyester resins employed in the resin compositions of the present invention are generally ultraviolet light setting resins, from the viewpoint of manufacturing efficiency, a release agent which forms a cross-linked structure on exposure to ultraviolet light is generally more efficient. The reason being that when a release agent which forms a cross-linked structure after thermal activation is used, an additional heating step must be employed either directly before or directly after the ultraviolet light setting step.

The above described release agents which are capable of assuming a cross-linked structure are employed in the resin compositions of the present invention such that for 100 parts by weight of the mixture of polyester resin and cross-linking agent, a total of preferably 0.01 to 30 parts by weight, or more preferably 0.05 to 25 parts by weight, of at least one of the above release agents is added. By employing the release agents in such an amount, blocking between the color sheet and the image receiving substrate is avoided, and furthermore, smudging, smearing and bleeding is avoided, even under high temperature and/or high pressure printing and copying conditions. If the amount of release agent employed is less than 0.01 parts by weight of the total amount of polyester resin and cross-linking agent, the releasing effect is insufficient. Conversely, if the amount of release agent employed is greater than 30 parts by weight of the total amount of polyester resin and cross-linking agent, the sublimation dispersion dye permeability of the resin composition formed therefrom is insufficient, resulting in insufficiently dark printing or copying.

If necessary, and as long as the effects of the present invention are not impaired, the release agents can be supplemented with silicon oil, silicon type detergents, fluorine type detergents, graft polymers with polyorganosiloxane side chains or polyorganosiloxane main chains, and the like.

The resin compositions of the present invention as described in the preceding sections in general meet the primary objectives set forth therefor. However, in those cases where improved photostability is desirable, the resin compositions of the present invention can be further enhanced by the addition of at least one type of benzotriazol ultraviolet light absorbing agent in a total amount of 1 to 10 parts by weight and at least one type of hindered amine photo stabilizer in a total amount of 1 to 10 parts by weight.

As a further enhancement to the resin compositions of the present invention, by addition of one or more additional benzotriazol ultraviolet light absorbing agents and hindered amine photo stabilizers in a preset ratio to the enhanced resin compositions described in the preceding paragraph, exceedingly high resistance to fading can be provided. For dye sensitive resin compositions which are highly light stable and resistant to fading, both benzotriazol ultraviolet light absorbing agents and hindered amine photo stabilizers are essential components. However, if the either the benzotriazol ultraviolet light absorbing agents or hindered amine photo stabilizers described in the previous paragraph are used independently, or if benzotriazol ultraviolet light absorbing agents or hindered amine photo stabilizers other than those described in this paragraph are used, little improvement results in photostability, or in resistance to fading.

Examples of suitable benzotriazol ultraviolet light absorbing agents include 2-(5-methyl-2-hydroxyphenyl) benzotriazol (Tinuvin ® P, Ciba-Geigy), 2-(2-hydroxy-3,5-bis(2,2-dimethyl-benzyl) phenyl)-2H-benzotriazol (Tinuvin ® 234, Ciba-Geigy), 2-(3,5-di-o-butyl-2-hydroxyphenyl) benzotriazol (Tinuvin ® 320, Ciba-Geigy), 2-(3-t-butyl-5-methyl-2-hydroxyphenyl)-5-chlorobenzotriazol (Tinuvin ® 326, Ciba-Geigy), 2-(3,5-di-t-butyl-2-hydroxyphenyl)-5-chlorobenzotriazol (Tinuvin® 327, Ciba-Geigy), 2-(3,5-di-t-butyl-2-hydroxyphenyl) benzotriazol (Tinuvin® 328, Ciba-Geigy), or combinations of two or more thereof, added in a total amount of 1 to 10 parts by weight, or more preferably 2 to 8 parts by weight, to 100 parts by weight of the combined polyester resin and cross-linking agent. When employed in a total amount of less than 1 part by weight per 100 parts by weight of the combined polyester resin and cross-linking agent, ability to absorb sublimation dispersion dye, photostability and resistance to darkening under storage suffer. Conversely, employed in a total amount of greater than 10 parts by weight per 100 parts by weight of the combined polyester resin and cross-linking agent, hardening of the resin compositions after exposure to activating energy suffers.

Examples of suitable hindered amine photo stabilizers include bis(2,2,6,6-tetramethyl-4-piperidyl)sebacate (Sanol® LS770, Sankyo), bis(1,2,2,6,6-pentamethyl-4-piperidyl) sebacate (Sanol® LS765, Sankyo), succinic acid dimethyl-1-(2-hydroxyethylene)-4-hydroxy-2,2,6,6-tetramethyl-4-piperidine polycondensate (Sanol® LS7222D, Sankyo), poly((6-(1,1,3,3-tetramethylbutyl)imino-1,3,5-triazine-2,4-diyl) ((tetramethyl-4-piperidyl)imino)hexamethylene(2,2,6,6-tetramethyl-4-piperidyl) imino (Sanol® LS944LD, Sankyo), 1-(2-((3-(3,5-di-t-butyl-4-hydroxyphenyl) propionyloxy)ethyl)-4-(3-(3,5-di-t-butyl-4-hydroxyphenyl) propionyloxy)-2,2,6,6-tetramethyl piperidine (Sanol® LS2626, Sankyo), or combinations of two or more thereof, added in a total amount of 1 to 10 parts by weight to 100 parts by weight of the combined polyester resin and cross-linking agent. When employed in a total amount of less than 1 part by weight per 100 parts by weight of the combined polyester resin and cross-linking agent, ability to absorb sublimation dispersion dye, photostability and resistance to fading suffer. Conversely, employed in a total amount of greater than 10 parts by weight per 100 parts by weight of the combined polyester resin and cross-linking agent, hardening of the resin compositions after exposure to activating energy suffers.

When cross-linking agents such as tetrahydrofurfuryl acrylate have been employed in the resin compositions of the present invention, the resulting polymers tend to be highly soluble and of low viscosity, for which reason the resin compositions prepared therefrom are very suitable in their manufactured state for various coating operations, such as roll coating, bar coating, blade coating and the like. However, addition of one or more appropriate solvents, for example ethyl alcohol, methyl ethyl ketone, toluene, ethyl acetate or dimethylformamide, will further enhance performance of these resins in various industrial application methods by reducing viscosity. By preparing a solution of appropriately low viscosity, the resin compositions of the present invention may be applied by easily formed methods such as spray coating, curtain coating, flow coating, dip coating and the like.

The various resin compositions of the present invention may appropriately be applied to various types of inorganic particulate materials when such a form is suited to the desired method of employment. Examples include silica, alumina, talc, titanium oxide, and other inorganic particulate materials with particle sizes on the order of microns.

The energy supplied to initiate cross-linking and polymerization during curing of the resin compositions of the present invention can be in the form of ultraviolet light, an electron beam, and various other types of activating energy, however, ultraviolet light is generally most convenient. When ultraviolet light is being used, it is often desirable to add a photo initiator, in an amount of 0.1 to 10 parts by weight per 100 parts by weight of the combined polyester resin and cross-linking agent. Examples of such agents include benzoin, benzoin isobutyl ether, benzyl dimethylketal, ethylphenyl glyoxylate, diethoxy acetophenone, 1,1-dichloro acetophenone, 4'-isopropyl-2-hydroxy-2-methyl propiophenone, 1-hydroxycyclohexylphenylketone, benzophenone, benzophenone/diethanolamine, 4,4'-bisdimethylamino benzophenone, 2-methyl thioxanthone, t-butyl anthraquinone, benzyl and other carbonyl compounds, tetramethyl thiuram monosulphide, tetramethyl thiuram disulphide and other sulphur compounds; azobis isobutyronitrile, azobis-2,4-dimethyl valeronitrile and related azo compounds, and benzoyl peroxide, di-t-butyl peroxide and other related peroxide compounds. The above compounds may be added as only one of the above, or in combinations of two, three or more.

The type of substrate to which the resin compositions of the present invention are applied of course varies according to the printing process, copying process, etc.. Suitable examples include cotton textiles, PET film, polyvinyl chloride film, PMMA sheet material, PC sheet material, acrylate lenses, polyester buttons, nylon buckles, paper, PP paper and the like. After one or more of the resin compositions of the present invention has been applied to an appropriate substrate by a suitable application method, activating energy is then supplied to effect hardening and curing.

The sublimation dispersion dye receptive resin compositions of the present invention are characterized in being highly receptive to sublimation dispersion dyes and easily dyed thereby. Moreover, when applied to a suitable copying or printing process, these resin compositions are uniquely capable of capturing and maintaining a vivid and distinct color image, in comparison with conventional resins. Additionally, using the resin compositions of the present invention, dying, print, copying, coloring, etc. can be accomplished at much lower temperatures and more rapidly than with conventional resins. Furthermore, the resin compositions of the present invention offer outstanding photostability and resistance to fading. Images and colors captured by these resin compositions are remarkably enduring, even with prolonged exposure to sun light. The resins are uniquely applicable to a wide range of substrate materials, as well as to a variety of printing, copying and coloring processes employing sublimation dispersion dyes. When desirable, highly glossy and lustrous images can be produced. In particular, these resin composition are exceedingly transparent and cause minimal scattering of transmitted light for which reason they are uniquely suited to the manufacture of transparencies to be utilized in overhead projection techniques.

Hereinafter, examples of the present invention will be presented and explained.

REFERENCE EXAMPLE 1

Synthesis of the Transfer Sheet

The transfer sheet was synthesized by applying a 5% solution of Kayaset blue 136 (Nippon Kayaku) in trichloroethylene evenly to a transfer paper of a thickness of 60 micrometers which is obtainable on the market.

REFERENCE EXAMPLE 2

Dry Thermal Transfer Method

Paper was spread on an iron plate, a product formed by the applying and curing of the resin composition of the present invention was overlaid on this, and the transfer sheet synthesized in Reference Example 1 above was placed on top. On top of this, 85-micrometer-thick paper obtainable on the market was laid, and this was heated by means of a hotplate to 145° for 10 sec. under pressure of 1 $kg/cm^2$.

REFERENCE EXAMPLE 3

Evaluation of Blocking Resistance

After the dry thermal transfer of Reference Example 2 above, the transfer sheet was peeled off the dyed product; if it was possible to easily peel off the sheet, the absence of blocking is indicated by "good," while if there was considerable adherence and the application of force was necessary, this is indicated by "not good."

REFERENCE EXAMPLE 4

Measurement Method for Color Density

This color density is obtained by measuring the reflectivity R using a color analyzer (made by Hitachi, model 307) and determining -logR.

REFERENCE EXAMPLE 5

Photostability Evaluation Method

Evaluation was made according to the color-difference ΔE (measured by Hunter color difference meter according to JIS Z-8730) before and after exposure using a xenon fade meter (made by Suga Shikenki, model FAL-25AX). A blue scale (JIS L-0841) was used for comparison.

REFERENCE EXAMPLE 6

Fading Evaluation Method

Color density change was evaluated after exposure on a scale of 100 in an atmosphere of 60° and 60% humidity. A minus mark indicates that color density decreased in comparison with the initial period.

EXAMPLES 1-7, COMPARATIVE EXAMPLES 1-9

After the resin compounds shown in Table 1 were mixed and prepared, these were evenly applied by means of the dipping method to one side of a 125-micrometer-thick white polyester film (made by Diafoil, W-300), this was irradiated with ultraviolet radiation in an air atmosphere by means of a 2 kW high-pressure mercury lamp, and a sublimation dispersion dyeable product obtained; this was evaluated in accordance with the reference examples. The results of this are shown in Table 1. The composition of Example 7 cannot easily be cured when irradiated with ultraviolet radiation in an air atmosphere, so in the case of this example curing was carried out in a nitrogen atmosphere.

Furthermore, full-surface black pictures of the products of Examples 1-7 were recorded using an SCT-CP100 (made by Mitsubishi Denki), which is a thermal transfer sublimation-type video printer, whereupon it was noted that characteristics of release from the color sheet were good. The gloss of the black picture surfaces was measured, whereby the results shown in Table 2 were obtained. The color sheets used for recording were color sheets for OHP use which were provided with the SCT-CP100. Comparative Image Paper Example 9 used image paper of a type for use with the SCT-CP100.

TABLE 1

| Composite Elements (parts by weight) | | Examples | | | | | | | Comparative Examples | | | | | | | |
|---|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 | 8 |
| Cross-linking agents | 2P6A | 3 | 3 | 3 | 3 | 3 | 3 | | 3 | 3 | 3 | 0.1 | 15 | 3 | 3 | 3 |
| | 2P5A | 4 | 4 | 4 | 4 | 4 | 4 | | 4 | 4 | 4 | 0.1 | 15 | 4 | 4 | 4 |
| | 2P4A | 3 | 3 | 3 | 3 | 3 | 3 | | 3 | 3 | 3 | 0.1 | 10 | 3 | 3 | 3 |
| | A-DEP | 10 | 10 | 10 | 10 | 10 | 10 | | 10 | 10 | 10 | 0.3 | 40 | 10 | 10 | 10 |
| | TMPTA | | | | | | | 20 | | | | | | | | |
| Resins | Polyester resin A | 60 | 0 | 60 | 60 | 60 | 60 | 60 | 60 | 60 | 60 | 75.0 | 15 | 60 | | 60 |
| | Polyester resin B | 20 | 80 | 20 | 20 | 20 | 20 | 20 | 20 | 20 | 20 | 24.4 | 5 | 20 | | 20 |
| | Acrylic resin A | | | | | | | | | | | | | | 80 | |
| Releasing agents | UV-a | 9 | 9 | | | 9 | | | 0 | 40 | 0.005 | 0.01 | 9 | | | |
| | UV-b | | | 9 | | | 9 | | | | | | | | | |
| | UV-c | | | | 9 | | | | | | | | | | | |
| | UV-d | | | | | | | 9 | | | | | | | | |
| | Silicon surface activating agent A | | | | | | | | | | | | | 9 | | |
| | $PM_1/EA$ | | | | | | | | | | | | | | 9 | |
| | Graft polymer GP-1 | | | | | | | | | | | | | | | 9 |
| Stabilizing agents | Ultraviolet absorber 2-(3,5-di-t-butyl-2-hydroxyphenyl)-benzotriazol | | | | | 4 | 4 | | | | | | | | | |
| | Photostabilizer bis-(1,2,2,6,6-pentamethyl-4-piperidyl)-sebacate | | | | | 4 | 4 | | | | | | | | | |
| Light-activated polymerizing agent | 1-hydroxycyclo hexylphenylketone | 5 | 5 | 5 | 5 | 5 | 5 | 5 | 5 | 5 | 5 | 5 | 5 | 5 | 5 | 5 |
| Solvents | methylethylketone | 400 | 400 | 400 | 400 | 400 | 400 | 400 | 400 | 400 | 400 | 400 | 400 | 400 | 400 | 400 |
| | toluene | 100 | 100 | 100 | 100 | 100 | 100 | 100 | 100 | 100 | 100 | 100 | 100 | 100 | 100 | 100 |

| Examples | | | | | | |
|---|---|---|---|---|---|---|
| 1 | 2 | 3 | 4 | 5 | 6 | 7 |

TABLE 1-continued

| | | | | | | | | |
|---|---|---|---|---|---|---|---|---|
| Results | Anti-blocking characteristics | Good | Good | Good | Good | Good | Good | Good |
| | Degree of dyeing (−logR) | 0.78 | 0.69 | 0.75 | 0.77 | 1.18 | 1.15 | 0.65 |
| | Fading (%) | | | | | | | |
| | 5 days exposure | +2 | −1 | 0 | +1 | +1 | +1 | −3 |
| | 10 days exposure | 0 | +1 | +2 | +2 | +2 | +2 | 0 |
| | Visual observation after 10 days of exposure | No problems | No problems | No problems | No problems | No problems | No problems | No problems |
| | Photostability (ΔE) 3 days exposure (1) | 20.3 | 22.5 | 21.1 | 20.8 | 4.4 | 4.2 | 24.5 |
| | Remarks | | | | | | | |

| | | Comparative Examples | | | | | | | |
|---|---|---|---|---|---|---|---|---|---|
| | | 1 | 2 | 3 | 4 | 5 | 6 | 7 | 8 |
| Results | Anti-blocking characteristics | Not good | Good | Not good | Not good | Good | Good/ Not good | Good/ Not good | Good/ Not good |
| | Degree of dyeing (−logR) | | 0.33 | | | 0.19 | 0.56 | 0.54 | 0.58 |
| | Fading (%) | | | | | | | | |
| | 5 days exposure | | −5 | | | −6 | +5 | +6 | +3 |
| | 10 days exposure | | −11 | | | −15 | +13 | +18 | +9 |
| | Visual observation after 10 days of exposure | | Colors became weak | | | Colors became weak | Colors very blurry | Colors very blurry | Colors somewhat blurry |
| | Photostability (ΔE) 3 days exposure (1) | | 27.5 | | | 26.8 | 26.5 | 27.5 | 26.3 |
| | Remarks | Transfer sheet adhered to dyeing surface, evaluation impossible | | Transfer sheet adhered to dyeing surface, evaluation impossible | | | Release agent (silicon surface activating agent A) bled somewhat on the surface | | |

(1) The delta-E values of the control third-grade, fourth-grade, and fifth-grade blue scales are: third grade - 28.0, fourth grade - 4.5, and fifth grade - 6.1.

(1) The delta-E values of the control third-grade, fourth-grade, and fifth-grade blue scales are: third grade - 28.0, fourth grade - 4.5, and fifth grade - 6.1.

2P6A: Dipentaerythritolhexaacrylate

2P5A: Dipentaerythritolpentaacrylate

2P4A: Dipentaerythritoltetraacrylate

A-DEP: 2,2-bis(4-acryloyloxydiethoxyphenyl)propane

TMPTA: trimethylolpropanetriacrylate

Polyester resin A: A resin polymerized by means of the condensation of: terephthalic acid/isophthalic acid/sebacic acid/ethylene glycol/neopentyl glycol (molecular weight 20,000–25,000, Tg 10° C.).

Polyester resin B: A resin obtained by means of the condensation of: terephthalic acid/isophthalic acid/-sebacic acid/ethylene glycol/neopentyl glycol/1,4-butanediol (molecular weight 15,000–20,000, Tg 45° C.).

Acrylic resin A: A polymer with a 60/40 ration of butylmethacrylate to methylmethacrylate; Tg 50° C.

Silicon surface activating agent A:

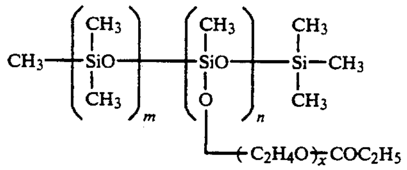

$$\frac{2m+n+1}{nx} = 1.3$$

$PM_1$: methacryloxyethylphosphate

EA: lauryldiethanolamine

UV-a:

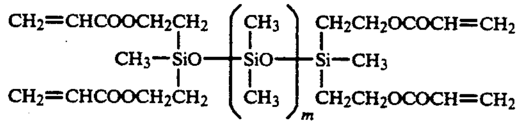

Molecular weight approximately 10,000.

UV-b:

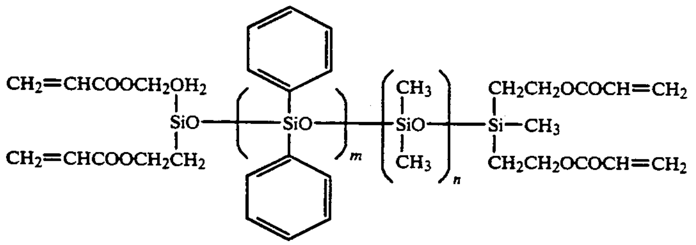

Molecular weight approximately 12,000; m/n=15/85 mol ratio.

UV-c:

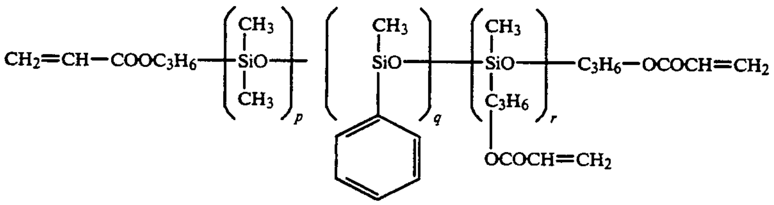

Molecular weight approximately 15,000; p/q/r=80/15/5 mol ratio.

UV-d:

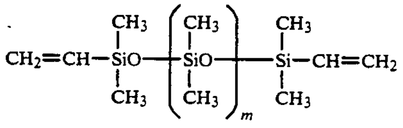

Molecular weight approximately 10,000.

Composition method of graft polymer GP-1

| | |
|---|---|
| Polydimethylsiloxane of one-ended methacryloyloxypropyl (molecular weight 5000): | 100 g |
| Methylmethacrylate: | 200 g |
| Benzoyl superoxide: | 3 g |
| Toluene: | 500 g |

The above composition was placed in a 3 liter flask of an agitator, and after being nitrogen-replaced, polymerized for 8 hours at 90° C. This polymer liquid was added to large- weight methanol and the polymer was recovered by medimentation.

The branch portion of the graft polymer thus obtained was polydimethylsiloxane, while the trunk portion was polymethylmethacrylate; the polymer was thus a composite of polydimethylsiloxane and polymethylmethacrylate in a 33/67 ratio, with a molecular weight of approximately 80,000.

TABLE 2

| | SURFACE GLOSS AFTER RECORDING OF FULL-SURFACE BLACK PICTURES | | | | | | | |
|---|---|---|---|---|---|---|---|---|
| | Example 1 | Example 2 | Example 3 | Example 4 | Example 5 | Example 6 | Example 7 | Comp. Example 9 |
| Gloss (%) (1) | 92 | 93 | 94 | 90 | 91 | 92 | 93 | 37 |

EXAMPLES 8 AND 9, COMPARATIVE EXAMPLE 10

After the compositions of Table 3 were mixed and prepared, these were applied by means of the dipping method to one side of a 125-micrometer-thick white polyester film (made by Diafoil, W-300), this was irradiated with ultraviolet radiation by means of a 2 kW high-pressure mercury lamp, in an air atmosphere in the case of Example 8, and in a nitrogen atmosphere in the case of Example 9, and cured for I hour at 100° C. A sublimation dispersion dyeable product having an image-receiving layer of 5-6 micron thickness was obtained; this was evaluated in accordance with reference examples 1-6. The results of this are shown in Table 3.

Furthermore, full-surface black pictures of the products of Examples 8 and 9 were recorded using an SCT-CP100 (made by Mitsubishi Denki), which is a thermal transfer sublimation-type video printer, whereupon it was noted that characteristics of release from the color sheet were good. The gloss of the black picture surfaces was measured, whereby the results shown in Table 4 were obtained. The color sheets used for recording were color sheets for OHP use which were provided with the SCT-CP100. Comparative Image Paper Example 10 used image paper of a type for use with the SCT-CP100.

TABLE 3

| Composition Elements (parts by weight) | | Example 8 | Example 9 |
|---|---|---|---|
| Cross-Linking Agents | 2P6A | 2 | |
| | 2P5A | 3 | |
| | 2P4A | 3 | |
| | B-DA | 12 | |
| | Urethane acrylate A | | 5 |
| | Pentaglyceroltriacrylate | | 15 |
| Resins | Polyester resin C | 40 | 40 |
| | Polyester resin D | 40 | 40 |
| Releasing Agents | KF-393 | 5 | |
| | KF-858 | | 5 |
| | X-22-343 | 5 | |
| | KF-101 | | 5 |
| Light-activated Polymerization Initiator | benzyldimethylkethal | 6 | 6 |
| Solvents | methylethylketone | 300 | 300 |
| | toluene | 200 | 200 |
| Atmosphere during ultraviolet curing | | Air | Nitrogen |

TABLE 3-continued

| Composition Elements (parts by weight) | | | Example 8 | Example 9 |
|---|---|---|---|---|
| Results | Anti-blocking characteristics | | Good | Good |
| | Dyeing degree (−logR) | | 0.75 | 0.77 |
| | Fading (%) | 10 days exposure | 0 | +1 |
| | | Visual observation after 10 days of exposure | No problems | No problems |
| | Photostability (Δ-E), 3 days exposure (1) | | 21.1 | 20.5 |

(1) The Δ-E values of the control third-grade, fourth-grade, and fifth-grade blue scales are: third grade = 28.0, fourth grade = 4.5, and fifth grade = 6.1.

(1) The Δ-E values of the control third-grade, fourth-grade, and fifth-grade blue scales are: third grade=28.0, fourth grade=4.5, and fifth grade=6.1.

B-DA:

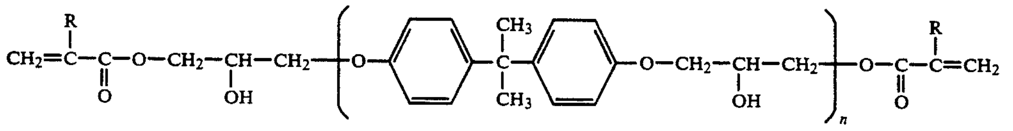

Urethane acrylate A:

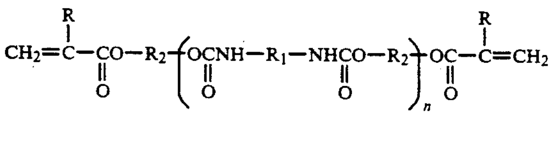

n=2, R is —H or —$CH_3$.

$R_1$ is isophoronediisocyanate.

$R_2$ is 1,4- butanediol.

Polyester resin C: A resin polymerized by means of the condensation of: terephthalic acid/isophthalic acid-/ethylene glycol/neopentyl glycol (molecular weight 15,000–20,000, Tg 65° C.).

Polyester resin D: A resin polymerized by means of the condensation of: terephthalic acid/sebacic acid-/ethylene glycol/neopentyl glycol (molecular weight 20,000–25,000, Tg 10° C.).

KF-393: Amino-modified silicon oil (made by Shin-Etsu Kagaku Kogyo).

KF-858: Amino-modified silicon oil (made by Shin-Etsu Kagaku Kogyo).

X-22-343: Epoxy-modified silicon oil (made by Shin-Etsu Kagaku Kogyo).

KF-101: Epoxy-modified silicon oil (made by Shin-Etsu Kagaku Kogyo).

TABLE 4

| | Example 8 | Example 9 | Comparative Example 10 |
|---|---|---|---|
| Gloss (%) (1) | 93 | 92 | 37 |

(1) Measurement based on JIS P-8142.

What is claimed is:

1. A sublimation dispersion dye receptive resin composition comprising 100 parts by weight of a mixture of 40–95 percent by weight of polyester resin and 5–60 percent by weight of cross-linking agent, curable by activating energy, for promoting hardening when exposed to activating energy; and 0.01–30 parts by weight of cross-linkable releasing agent, which can form cross-linked structures, selected from the group consisting of silicon-containing cross-linkable releasing agents and fluroine-containing cross-linkable releasing agents, wherein said cross-linkable releasing agents are:

a. free radical polymerizable, or b. combination of one or more silicon compounds having vinyl radicals and one or more silicon compounds having Si-H radicals, or c. combinations of one or more amino modified silicon compounds and one or more epoxy modified silicon compounds, or d. combinations of one or more silicon compounds having vinyl radicals and one or more silicon compounds having methylsilane radicals, or e. combinations of one or more fluorine containing compounds having epoxy radicals and one or more fluorine containing compounds having amino radicals.

2. A sublimation dispersion dye receptive resin composition comprising 100 parts by weight of a mixture of 40–95 percent by weight of polyester resin and 5–60 percent by weight of cross-linking agent, curable by activating energy, for promoting hardening when exposed to activating energy;

0.01–30 parts by weight of cross-linkable releasing agent, which can form cross-linked structures, selected from the group consisting of silicon-containing cross-linkable releasing agents and fluorine-containing cross-linkable releasing agents;

1–10 parts by weight of a benzotriazol ultraviolet stabilizer; and

1–10 parts by weight of a hindered amine photostabilizer;

wherein said cross-linkable releasing agents are:

a. free radical polymerizable, or b. combination of one or more silicon compounds having vinyl radicals and one or more silicon compounds having Si-H radicals, or c. combinations of one or more amino modified silicon compounds and one or more epoxy modified silicon compounds, or d. combinations of one or more silicon compounds having vinyl radicals and one or more silicon compounds having methylsilane radicals, or e. combinations of one or more fluorine containing compounds having epoxy radicals and one or more fluorine containing compounds having amino radicals.

3. A sublimation dispersion dye receptive resin composition in accordance with claim 1 or 2, wherein said polyester resin is a linear thermoplastic polyester resin having a molecular weight of 2000–40,000 and a crystallization degree of 1% of less.

4. A sublimation dispersion dye receptive resin composition in accordance with claim 1 or 2, wherein said activating energy is ultraviolet radiation.

5. A sublimation dye receptive resin composition in accordance with claim 1 or 2, wherein the cross-linkable releasing agents are free radical polymerizable silicon compounds or fluorine containing compounds having vinyl, ally, methacryloyl or acryloyl radicals.

6. A sublimation dye receptive resin composition in accordance with claim 1 or 2, wherein the cross-linkable releasing agents are combinations of one or more amino modified silicon compounds and one or more epoxy modified silicon compounds.

7. A sublimation dye receptive resin composition in accordance with claim 1 or 2, wherein the cross-linkable releasing agents is

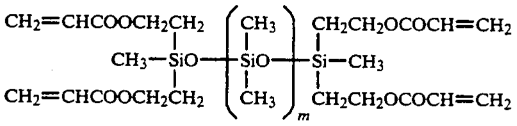

Molecular weight approximately 10,000.

8. A sublimation dye receptive resin composition in accordance with claim 1 or 2, wherein the cross-linkable releasing agents is

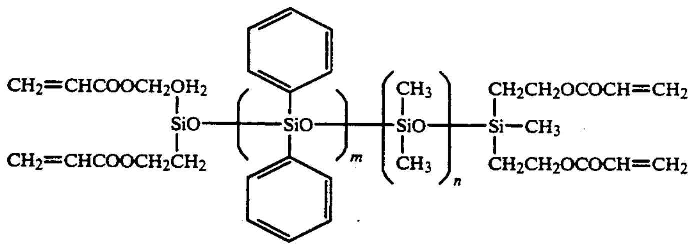

Molecular weight approximately 12,000; m/n=15/85 mol ratio.

9. A sublimation dye receptive resin composition in accordance with claim 1 or 2, wherein the cross-linkable releasing agents is

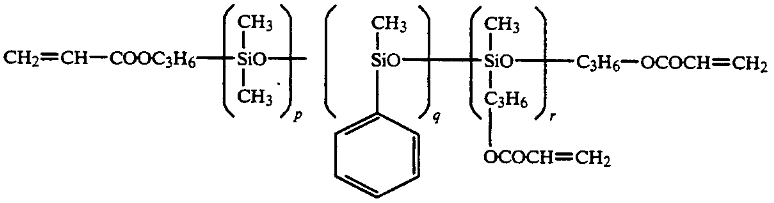

Molecular weight approximately 15,000; p/q/r=80/15/5 mol ratio.

10. A sublimation dye receptive resin composition in accordance with claim 1 or 2, wherein the cross-linkable releasing agents is

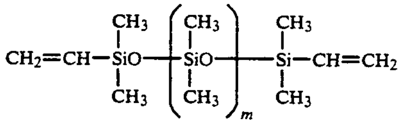

Molecular weight approximately 10,000.

* * * * *